Figure 1:
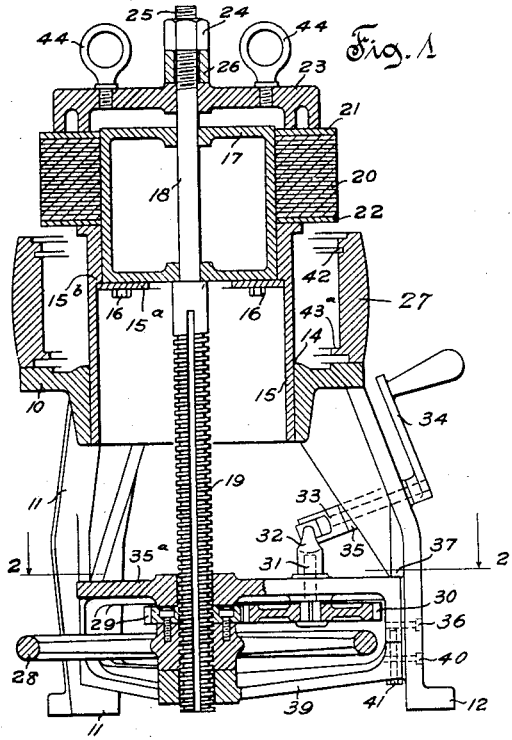

E. R. KNIGHT.
METHOD OF ASSEMBLING CORES OF ELECTRICAL APPARATUS.
APPLICATION FILED DEC. 11, 1913.

1,156,297.

Patented Oct. 12, 1915.
2 SHEETS—SHEET 1.

Witnesses
Rob. E. Stoll.
J. D. Kane

Inventor
E. R. Knight
By
Attorney

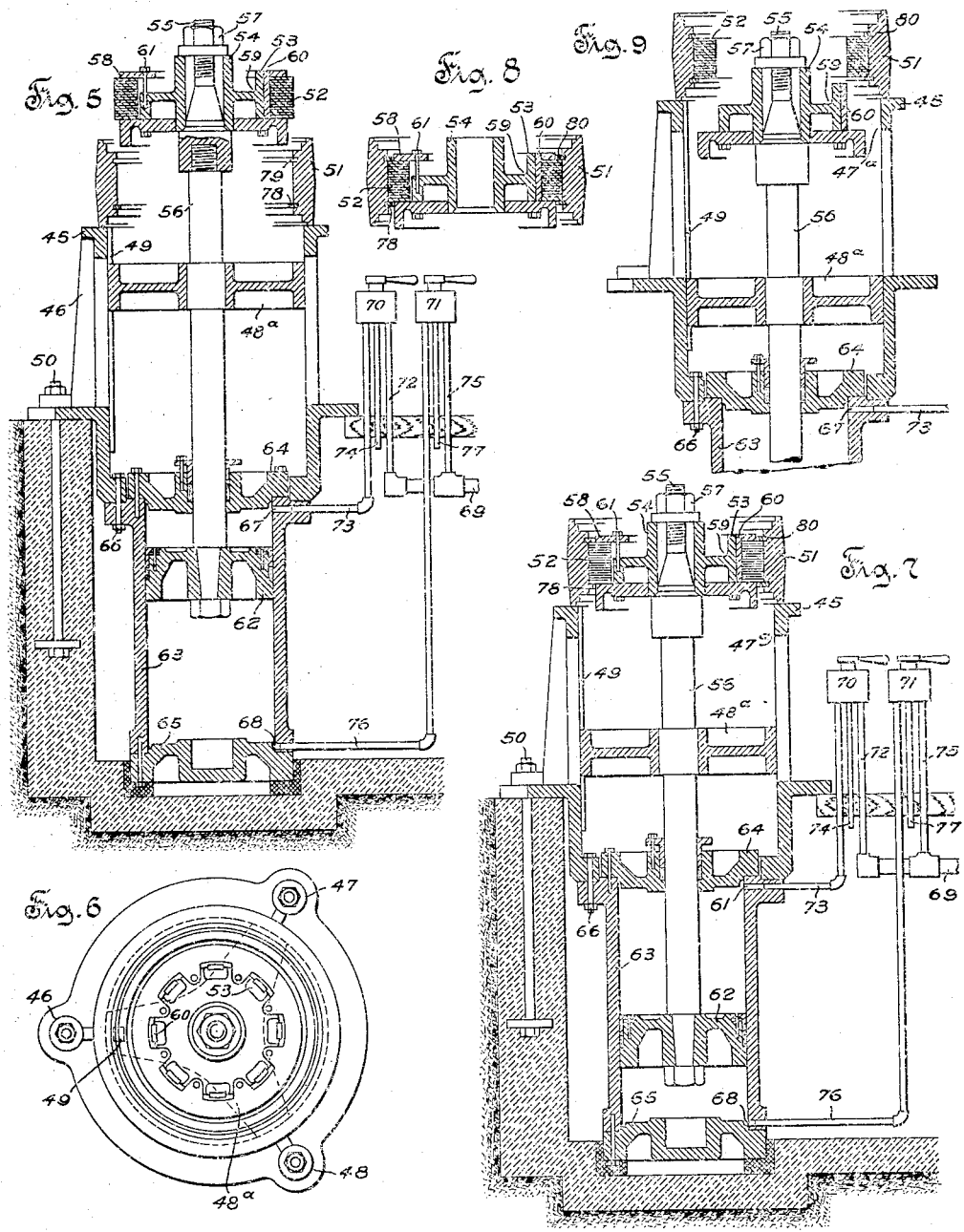

UNITED STATES PATENT OFFICE.

EARLE R. KNIGHT, OF NORWOOD, OHIO, ASSIGNOR, BY MESNE ASSIGNMENTS, TO ALLIS-CHALMERS MANUFACTURING COMPANY, A CORPORATION OF DELAWARE.

METHOD OF ASSEMBLING CORES OF ELECTRICAL APPARATUS.

1,156,297.  Specification of Letters Patent.  Patented Oct. 12, 1915.

Original application filed November 30, 1910, Serial No. 594,813. Divided and this application filed December 11, 1913. Serial No. 806,109.

*To all whom it may concern:*

Be it known that I, EARLE R. KNIGHT, a citizen of the United States, residing at Norwood, in the county of Hamilton and State of Ohio, have invented a certain new and useful Improvement in Methods of Assembling Cores of Electrical Apparatus, division of application Serial No. 594,813, filed November 30, 1910, of which the following is a specification.

This invention relates to methods of assembling cores of electrical apparatus, particular attention being directed to the assembling of cores of dynamo-electric machines.

The accurate and reliable assembling of cores of dynamo-electric machines and other electrical apparatus is a problem of no little moment. If the laminated core is built up piece by piece within or upon the frame or support, said core, when completely assembled, unless a great deal of valuable time has been used, will present rough surfaces. Some of the laminæ may project beyond others both radially and circumferentially. Again, when laminated cores are pressed as units into yokes or upon supporting elements of machines, there is a tendency for the laminæ to drift, that is, the slots for receiving the coils of windings will not be properly alined. The slots may be skewed and the sharp edges of laminæ extend into the slots. At best, it would be necessary to file or remove the projecting edges of laminæ to prevent such laminæ from piercing through the insulation around the coils and short circuiting or grounding the winding. The machine would thereby be rendered useless. By filing the laminæ after the core is assembled the burred edges of one lamina come into contact with adjacent laminæ and the fine filings sift in between the laminæ forming a continuous path for eddy currents. The eddy current loss occasioned by such practice is surprisingly large and necessarily decreases the efficiency of the machine. Again, too much time is spent ordinarily in the assembling of cores of dynamo-electric machines and other electrical apparatus.

In view of the above, it is the object of this invention to provide a novel, useful, simple and inexpensive method of assembling cores of electrical apparatus.

The various novel features of this invention will be described in the specification and particularly set forth in the appended claims.

This invention may be practised through the use of the machines illustrated in the accompanying sheets of drawings, in which—

Figure 3:
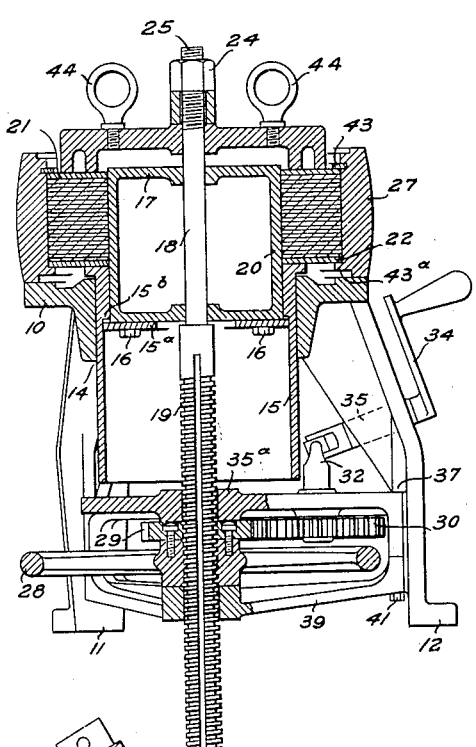
Figure 4:
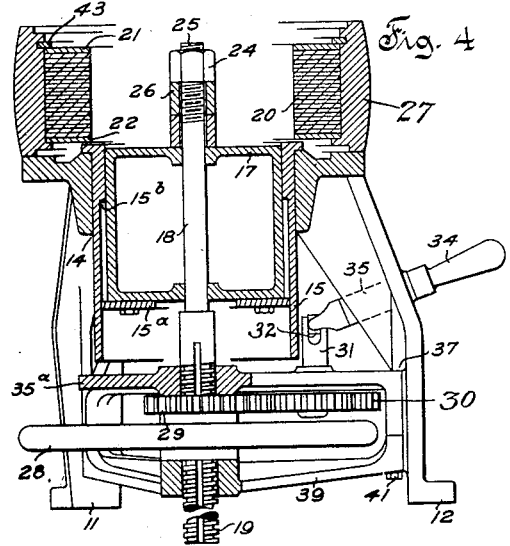
Figure 2:
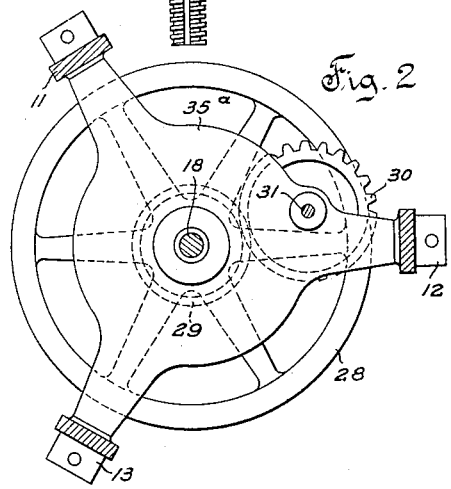

Figure 1 is a vertical sectional view of a machine for pressing cores into the yokes of dynamo-electric machines, this machine being particularly useful in the assembling of cores for small dynamo-electric machines; Fig. 2 is a view partly in section taken along the line 2—2 of Fig. 1, looking in the direction indicated by the arrows; Fig. 3 is a vertical sectional view of the same machine after the core has been pressed into the yoke of a dynamo-electric machine; Fig. 4 is a similar view with the mandrel removed after the core has been pressed into the yoke of a dynamo-electric machine; Fig. 5 is a vertical sectional view of a machine of the same general character as that shown in Fig. 1, but in this case the machine is pneumatically operated and is especially adapted for assembling cores for comparatively large dynamo-electric machines; Fig. 6 is a top elevation of the machine shown in Fig. 5; Fig. 7 is a vertical sectional view of a pneumatically operated machine after it has pressed the laminated core into the yoke of the dynamo-electric machine; Fig. 8 is a longitudinal sectional view of a stator of a dynamo-electric machine with the mandrel still fastened within the core; and Fig. 9 is a vertical sectional view of the core assembling machine with the mandrel removed from the core structure after the core has been pressed into the yoke.

One of the machines, the one which is particularly adapted for assembling cores of small dynamo-electric machines, has an annular base 10, which is supported by three integrally formed legs 11, 12, and 13. This base is provided with an annular opening 14 through which a guide 15 is adapted to slide. Secured by bolts 16 to a ring 15ᵃ which engages an inside shoulder portion 15ᵇ of the guide 15 is a mandrel 17 through which passes a shaft or movable member 18 having a threaded portion 19 by means of which motion is transmitted to said mandrel and guide. A laminated core 20, to be pressed into electrical apparatus, is formed about the mandrel and is held between two comparatively heavy metal plates 21 and 22, the latter of which rests upon the upper portion of the guide 15 and the former of which is pressed against the core by a cap 23. This cap is held against the plate 21 by a nut 24 engaging a threaded portion 25 of the shaft 18, said nut bearing down upon a collar 26, which is interposed between the nut 24 and the cap 23. The base 10 is provided with a flat surface upon which the yoke 27 of a dynamo-electric machine may be placed preparatory to having the core 20 pressed into it.

The mechanism for actuating the guide 15 and mandrel 17 with the core 20 secured thereto, comprises a hand wheel 28 having a threaded portion which engages the threaded portion 19 of the shaft 18. Secured to this hand wheel is a gear wheel 29 also engaging the threaded portion 19 of the shaft 18. The gear 29 meshes with another gear wheel 30 which is provided with a shaft 31, motion to which is transmitted through a universal joint 32 and shaft 33, from handle 34. The shaft 33 passes through a lug 35 formed integral with one of the legs 12. The shaft 31 passes through a plate 35$^a$ which is secured to the legs 11, 12, and 13 by bolts 36 and engages shoulder portions 37 of said legs to prevent the upward movement of the plate 35$^a$ when the hand wheel 28 is turned for actuating the shaft 18. Another member 39 is secured to the legs 11, 12, and 13 by bolts 40 and also to the plate 35$^a$ by bolts 41. This member 39 forms a support for the hand wheel 28 and the gear wheel 29, said hand and gear wheels being interposed between the plate 35$^a$ and member 39.

After the yoke 27 of a dynamo-electric machine has been placed upon the base 10 and the core 20 has been mounted upon the mandrel and initially compressed a slight amount by nut 24, the handle 34 is rotated to draw down the shaft 18 with the guide, mandrel, and core until the core has reached the top of the yoke. At this point the hand wheel 28 is rotated gradually drawing the core 20 into the yoke 27. After the core is pressed completely into the yoke, the metal plate 21 being forced down below a groove 42 formed in the yoke, a split retaining ring 43 is placed in said groove for retaining the laminated core in its proper position, the other metal plate 22 being forced against a shoulder 43$^a$ of the yoke. At this point, the nut 24 may be screwed off the shaft 18 and the collar 26 and cap 23 also removed from the shaft. The cap 23 is provided with handles 44 so that the cap may be removed without any particular difficulty. After the cap has been removed the collar 26 and nut 24 may be again placed on the shaft 18 with the collar engaging the upper surface of the mandrel 17. By turning the hand wheel again in the same direction the mandrel will be drawn out of the laminated core 20 and the stator yoke in its complete form, provided it has been properly machined in the first place, is ready to receive its winding. If it is desired to bore or machine the stator after the core has been pressed into the yoke, a suitable mandrel may be used for that purpose and be kept in the core structure until the machine has been completed. Such an arrangement will be considered in the pneumatically operated machine to be referred to presently.

By referring to Figs. 1, 3, and 4, the different stages of assembling laminated cores in the yoke may be seen, Fig. 1 showing the core preparatory to being pressed in the yoke, Fig. 3 showing the core pressed into the yoke, and Fig. 4 showing the core pressed into the yoke and the mandrel removed from the core.

The handle 34 is used only for giving the shaft a rapid movement and is adapted only for light work, while the hand wheel 28 is used for the heavy work of pressing cores into the yokes.

This manually operated core assembling machine is more particularly adapted for assembling cores of comparatively small dynamo-electric machines. For the purpose of pressing cores into comparatively large dynamo-electric machines, a machine is provided which is operated pneumatically and which is illustrated in Figs. 5 to 9 inclusive. It is not desired to be limited to pneumatically operated machines, for hydraulic, steam-operated, or any power operated machine or any other means can be used for carrying out the invention. The base 45 of this pneumatically operated machine or device is provided with three legs 46, 47, and 48 which are secured to any suitable foundation by foundation bolts 50. This base 45 has a bored portion 47$^a$ in which a guide 48$^a$ is adapted to slide. This guide is provided with a groove which receives a feather 49 for keeping said guide from turning. The base 45 is adapted to support a yoke 51 of a dynamo-electric machine adapted to receive a laminated core 52 which is mounted on a mandrel 53 having a hub 54. A threaded stem 55 passes through the hub 54 and engages a shaft 56 to which the guide 48$^a$ is secured. A nut 57 engaging the stem 55 presses down on the hub 54 of the mandrel which includes an annular member 58 bolted to the main portion of the mandrel. Secured to a flanged portion 59 of the mandrel are steel plates 60 which act as centering and guiding portions for the laminations in assembling the core. These plates 60 may have any thickness and curvature to be used in connection with any particular core, that is, by using different sets of such plates, the plates of each set being of the same radial thickness and curvature, cores of different internal diameters may be assembled. These steel plates are arranged circumferentially of the mandrel and occur alternately with the bolts 61 which hold the plate 58 against the laminated core. The lower end of the shaft or movable member 56 is provided with a piston 62 which is adapted to move in a cylinder 63 having end heads 64 and 65. The cylinder is secured to the base 45 by bolts 66. The cylinder 63 is provided with ports 67 and 68 for the reception and expulsion of a fluid to be used for actuating the piston. The cylinder is connected to a fluid source 69 through valves 70 and 71 which control the admission and exhaust of fluid into and from the cylinder 63. The valve 70 is connected to the source of fluid supply by a pipe 72, to the upper end of the cylinder 63 by pipe 73, and to an exhaust pipe 74. Likewise valve 71 is connected to the source by a pipe 75 to the lower end of the cylinder 63 by pipe 76, and to an exhaust pipe 77.

When the yoke 51 is properly placed on the base 45 and the laminated core 52 mounted on the mandrel 53, valve 70 is operated to permit a flow of fluid through pipe 73 into the upper end of the cylinder 63, forcing the piston 62 downwardly and drawing the core 52 into the yoke 51. When the core has been drawn in the yoke 51 to the point where it engages the retaining ring 78, the upper portion of the core is pressed beyond the groove 79 in which is then placed another retaining ring 80 for holding the core in a fixed position. The machine in this position is illustrated in Fig. 7. The nut 57 may now be removed and the yoke with its laminated core, having the mandrel still located within the core, be mounted upon a boring machine to properly machine the yoke. The yoke, core, and mandrel are then brought back as a unit and again placed on the base of the assembling machine and the stem 55 passed through the hub of the mandrel. The nut 57 is then again screwed down tightly upon the hub of the mandrel and the valve 70 is operated to pass more fluid through the pipe 73 to the upper part of the cylinder 63 to force the piston downward until the mandrel is completely removed from the core as shown in Fig. 9. The stator is now ready to be wound. The valves 70 and 71 can now be operated so that fluid may pass through the pipe 76 forcing the piston 62 upwardly and permitting the exhaust fluid to be forced out of pipes 73 and 74. By using a pneumatic machine such as is here disclosed, any required power may be obtained for forcing cores of any size into yokes of dynamo-electric machines.

While specific machines have been described, by the aid of which this invention may be practised, these machines do not form a part of the present invention, being claimed in applicant's copending application, Serial No. 594,813, filed November 30, 1910.

It should be understood that the specific machines described merely indicate manners of practising the invention; for, obviously, the same may be practised by means other than those shown, or by hand. Further, it is not desired to be limited to the exact details of the method described for practising the invention except as required by the scope of the appended claims, for obvious modifications may occur to a person skilled in the art.

It is claimed and desired to secure by Letters Patent:

1. A method of assembling a laminated core in a dynamo-electric machine which comprises forming the core exterior to the machine, forcing the core into the yoke of said machine, and securing the core in fixed position in said yoke.

2. A method of assembling a laminated core in electrical apparatus, which comprises forming the core exterior to said apparatus, forcing said core into the frame of said apparatus, and securing said core in fixed position relative to said frame.

3. A method of assembling a core made up of a plurality of laminations in a dynamo-electric machine, which comprises forming said core of said laminations on a member exterior to said machine, actuating said member to force said core into the yoke of said machine, and then removing said member from said core.

4. A method of assembling a laminated core in a dynamo-electric machine, which comprises compressing a plurality of laminations and securing said laminations in such compressed condition on a part exterior to said machine, actuating said part to insert said core in the frame of said machine, securing said core in said frame, and then removing said part from said core.

5. A method of assembling a core in a dynamo-electric machine, which comprises forcing and holding together a plurality of annular laminations on a member having a guiding portion for said laminations, inserting said member and core within the frame of said machine, securing said core in said frame, and withdrawing said guiding portion from said core.

6. A method of assembling a portion of a dynamo-electric machine, which comprises forming a core of annular laminations on a member exterior to the yoke of said machine, inserting said core and member in said yoke and securing the core in fixed position relative to said yoke, and machining said yoke with said member in position in said core.

7. A method of assembling a complete yoke and core of a dynamo-electric machine, which comprises forcing and holding together a plurality of laminations on a member having a guide portion for said laminations to form a core, inserting and securing said member and core within the yoke of said machine, machining said yoke with said member in position within said core, and removing said member from said core.

8. A method of assembling a laminated core in a dynamo-electric machine which comprises forming the core exterior to a core-supporting element of said machine, forcing the formed core into final operative position relative to said core-supporting element, and securing said core in such position.

In testimony whereof, the signature of the inventor is affixed hereto in the presence of two witnesses.

EARLE R. KNIGHT.

Witnesses:
G. M. HIATT,
HARRY DETWILER.

Copies of this patent may be obtained for five cents each, by addressing the "Commissioner of Patents, Washington, D. C."